United States Patent [19]

Butler

[11] Patent Number: 4,577,711

[45] Date of Patent: Mar. 25, 1986

[54] TANDEM WHEEL FLEXIBLE DRIVE SUSPENSION

[76] Inventor: Claude O. Butler, 7074 Brentwood Dr., Brentwood Bay Post Office British Columbia, Canada, V0S 1A0

[21] Appl. No.: 614,110

[22] Filed: May 24, 1984

[30] Foreign Application Priority Data

Oct. 24, 1983 [CA] Canada ................................. 439573

[51] Int. Cl.⁴ ............................................. B62D 61/10
[52] U.S. Cl. ................................. 180/24.1; 180/24.12
[58] Field of Search ............. 180/15, 16, 24.02, 24.05, 180/24.08, 24.1, 24.12, 209

[56] References Cited

U.S. PATENT DOCUMENTS

| | | | |
|---|---|---|---|
| 1,068,044 | 7/1913 | Douglass | 180/24.12 |
| 1,534,810 | 4/1925 | Rivas | 180/24.02 |
| 1,608,069 | 11/1926 | Lacey | 180/24.05 |
| 1,653,156 | 12/1927 | Ebel . | |
| 1,858,781 | 5/1932 | Masury . | |
| 1,894,698 | 1/1933 | Markham . | |
| 2,206,752 | 7/1940 | Price . | |
| 2,298,282 | 10/1942 | Brown . | |
| 2,818,139 | 12/1957 | Sutter . | |
| 3,923,112 | 12/1975 | Goodgame . | |

FOREIGN PATENT DOCUMENTS

| | | |
|---|---|---|
| 313225 | 7/1931 | Canada . |
| 391590 | 10/1940 | Canada . |
| 428843 | 7/1945 | Canada . |

*Primary Examiner*—Robert G. Nilson
*Attorney, Agent, or Firm*—Merchant, Gould, Smith, Edell, Welter & Schmidt

[57] ABSTRACT

The invention is a tandem wheel suspension which may be utilized on a vehicle to replace a single axle suspension and increase vehicle performance. The single axle suspension can be incorporated into the tandem wheel suspension. Claims are made to the tandem wheel suspension and to a method of replacing a single axle suspension with such tandem wheel suspension.

16 Claims, 4 Drawing Figures

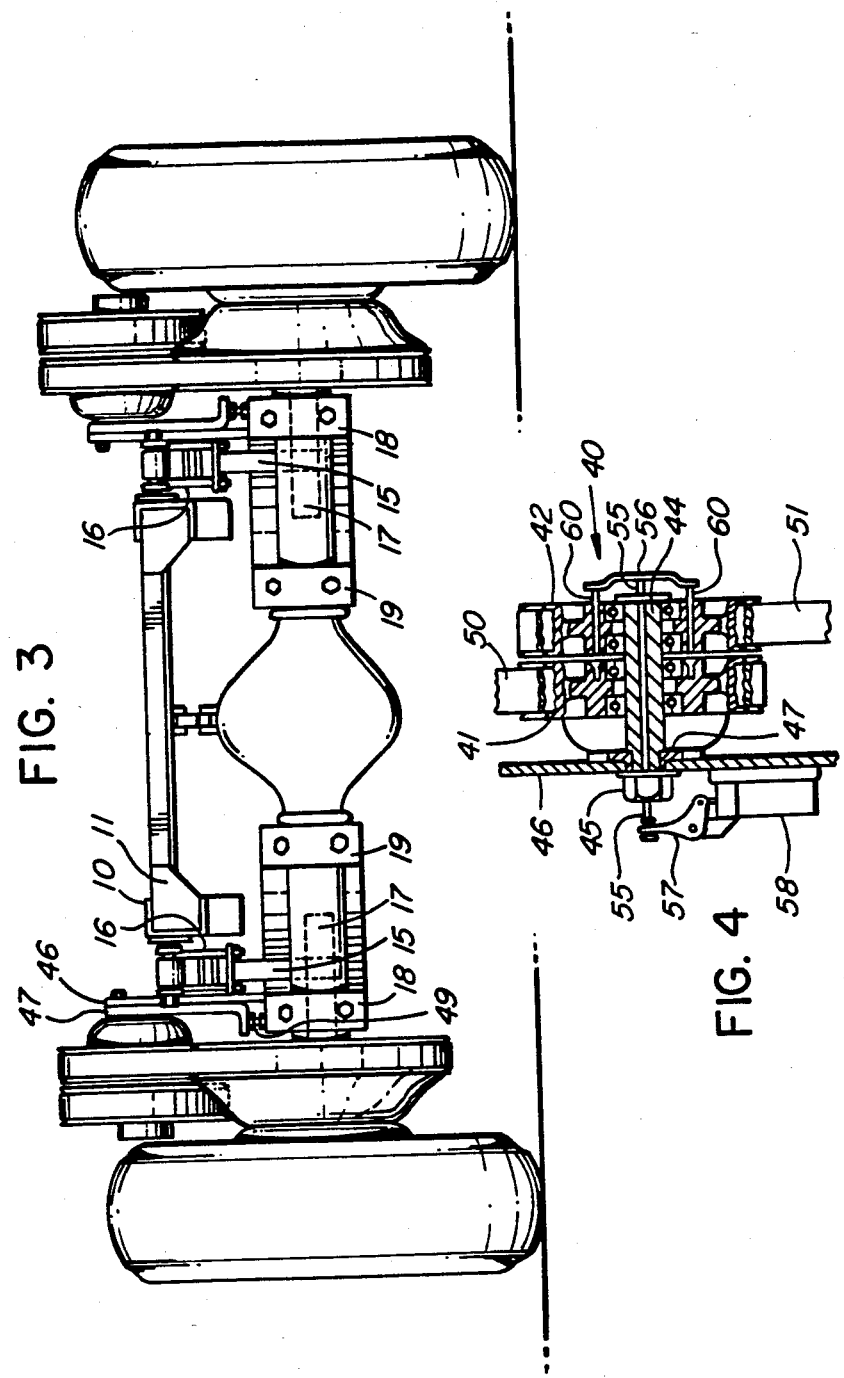

TANDEM WHEEL FLEXIBLE DRIVE SUSPENSION

This invention relates to a tandem rear wheel assembly for a vehicle, and more particularly, to that type of assembly which may be fitted to a vehicle having a single rear wheel axle.

A variety of vehicle tandem rear axle assemblies are known to the art. For instance, Canadian Pat. No. 313,225, granted to Arthur C. Woolensak on July 14, 1931, discloses a tandem rear wheel axle assembly in which drive power is transmitted from a position central of the axles and in which the assembly is connected to the frame of the vehicle at that central position. A similar arrangement is disclosed in Canadian Pat. No. 391,590, granted to Theodore A. Peterman on Oct. 1, 1940. Canadian Pat. No. 428,843, granted to Kenworth Loader Truck Corporation on July 17, 1945, discloses a tandem rear wheel axle assembly for a vehicle in which a driving shaft extends generally parallel to, and between, the pair of tandem rear axles, and in which each of the axles is connected to the driving shaft by a separate chain drive. Unlike the subject invention, each of the foregoing assemblies would be utilized with a vehicle originally designed for tandem rear wheel operation and it would not be feasible to utilize the existing rear axle of a vehicle in one of such assemblies when converting that vehicle to tandem rear wheel operation.

U.S. Pat. No. 2,818,139, granted to E. W. Sutter on Dec. 31, 1957, discloses an anti-skid device for a vehicle, which device can be connected to the rear axle of the vehicle to provide a tandem rear wheel construction during movement of the vehicle over slippery surfaces. With this arrangement, the original rear axle of the vehicle continues to support the weight of the rear of the vehicle even when the pair of wheels of the anti-skid device are lowered to a ground-engaging position; such an arrangement does not have the stability of the subject invention. The rear wheel arrangement of this reference also has an idler wheel positioned between each of the wheels on the rear axle and the associated wheel of the anti-skid device; slippage between each of the associated pair of wheels would result in excess wear to the working surface of the wheel tires.

The subject invention may be fitted to a vehicle, especially a recreational vehicle such as a motor home, that has an existing single pair of rear wheels to provide a tandem rear wheel assembly for that vehicle. The assembly of the subject invention has generally even loading on each of its four tires. The assembly also allows for a slight variation in wheel speed between the original pair of wheels incorporated therein and the new pair of wheels, that variation in speed possibly resulting from travel over a poor road surface. Further, the subject invention allows for the new pair of rear wheels to have selective drive engagement with the original pair of rear wheels. The tandem rear wheel assembly of the subject invention is capable of carrying an increased weight on the rear part of the vehicle, and results in added roll and directional stability, reduced slippage between the vehicle and the road, and improved comfort, braking power and fuel economy.

The subject invention is a tandem rear wheel assembly for a vehicle, which assembly comprises, firstly, an axle having a drivable first pair of wheels mounted thereon; secondly, a pair of arms each of which has its one end secured to the axle at a position between the centre of the axle and the respective one of the wheels mounted thereon; thirdly, a second pair of wheels each of which is mounted for rotation on the other end of the respective one of the pair of arms; and fourthly, engageable drive connection means between each wheel of the second pair of wheels and a respective one of the first pair of wheels. Each of the pair of arms are of equal length and extend from the axle in generally parallel spaced relation. The rotational axes of the second pair of wheels are parallel to the axle. The pair of drive connection means may be simultaneously engageable, and the second pair of wheels are adapted to be driven by the first pair of wheels during such engagement.

The wheel assembly may be mounted on the frame of the vehicle by a pair of suspension assemblies, each such suspension assembly extending from the frame of the vehicle to a central position on a respective one of the arms. Each suspension assembly may be a leaf spring assembly having its one end pivotally connected to the frame of the vehicle and its other end connected to the frame by a pivotal linkage. The center of each leaf spring assembly is connected to the central position on the respective one of the arms. Each second wheel may extend in the same plane as the respective one of the first pair of wheels.

The assembly may also comprise a pair of support members each such member extending at an angle to a respective one of the pair of arms and connecting to the axle and to the other end of that arm. Each support member may meet the axle at a position between the center of the axle and the position of which the respective arm meets the axle. A connecting link may extend between a central position on each arm and the respective support member, such that a pair of suspension assemblies mounting the wheel assembly on the frame of the vehicle each extends from the frame of the vehicle to a respective one of the connecting links. Each suspension assembly may be a leaf spring assembly having its one end pivotally connected to the frame and its other end connected to the frame by a pivotal linkage, the center of each leaf spring assembly being connected to the respective connecting link.

Each engageable drive connection means of the tandem rear wheel assembly may comprise a clutch means, first and second gear wheel members, first and second endless loop means, and actuation means to remotely actuate the clutch means. In such drive connection means, the clutch means is positioned between the wheel of the second pair of wheels and the respective one of the first pair of wheels, and is secured to a respective one of the arms and has an engageable pair of gear wheel members. The first gear wheel member is secured to the wheel of the second pair of wheels and has a common axis of symmetry with that wheel. The second gear wheel member is secured to the wheel of the respective one of the first pair of wheels and has a common axis of symmetry with that wheel. The first endless loop means extends around one of the engageable pair of gear wheel members and the first gear wheel member. The second endless loop means extends around the other of the engageable pair of gear wheel members and the second gear wheel member. Actuation of the clutch means engages the engageable pair of gear wheel members.

The first and second endless loop means may be flexible positive drive belts having integral teeth positioned along their working surface and the engageable pair of gear wheel members of the clutch means and the first and second gear wheel members may have a circumference configured with grooves for receiving the working surface of such belts. The engageable pair of gear wheel members of the clutch means may be rotatable on a common axis and have a pair of facing plates. A series of pins may be extendable out of the one plate to engage with a corresponding series of apertures in the other plate to connect the drum members of the clutch means in driving relationship.

The second pair of wheels may be positioned on the vehicle forward of the first pair of wheels.

In another form, the subject invention is a method for replacing a single pair of rear wheels of a vehicle with a tandem rear wheel assembly, which method comprises the initial step of supporting the rear portion of the vehicle so as to remove its weight from the rear wheel axle. The next step involves disconnecting the drive means from the rear wheel axle, and the third step involves removing the rear wheel axle from the suspension means that mounts that axle to the frame of the vehicle. The fourth step involves connecting to the axle a pair of arm assemblies, each arm assembly having its one end connected to the axle between the center of the axle and the respective end of the axle, the other end of each arm assembly having a wheel rotatably mounted thereon such that after connection of the arm assemblies to the axle the axis of rotation of each wheel is parallel to the axle, the axle and pair of arm assemblies together defining a tandem rear wheel assembly. The fifth step involves connecting the tandem rear wheel assembly to the suspension means, that connection being at a generally central position on each of the arm assemblies. The sixth step involves reconnecting the drive means to the tandem rear wheel assembly, and the final step involves removing the support from the rear portion of the vehicle such that the weight of the vehicle rests on the tandem rear wheel assembly.

The wheel mounted on the other end of each arm assembly may be connected through an engageable drive connection means to the rear wheel axle, engagement of the drive connection means engaging the drive means with the mounted wheel to drive that wheel.

The engageable drive connection means may comprise three endless loop means and a further pair of gear wheel members, that pair of gear wheels being engaged to rotate together on a common axis of symmetry on a respective one of the arms. In this construction, the first endless loop means extends around one of the engageable pair of gear wheel members and one of the first gear wheel member and the second gear wheel member. Also, the second endless loop means extends around one of the engaged pair of gear wheel members and the other of the first gear wheel member and the second gear wheel member. And the third endless loop means extends around the other of the engageable pair of gear wheel members and the other of the engaged pair of gear wheel members.

The subject invention will next be described by means of a preferred embodiment, utilizing the accompanying drawings, in which:

FIG. 3 is an end view of the tandem rear wheel assembly of the preferred embodiment, that end view being from the rear of the vehicle.

FIG. 4 is a cross-sectional plan view of the clutch of the tandem rear wheel assembly of the preferred embodiment.

Figure 1:
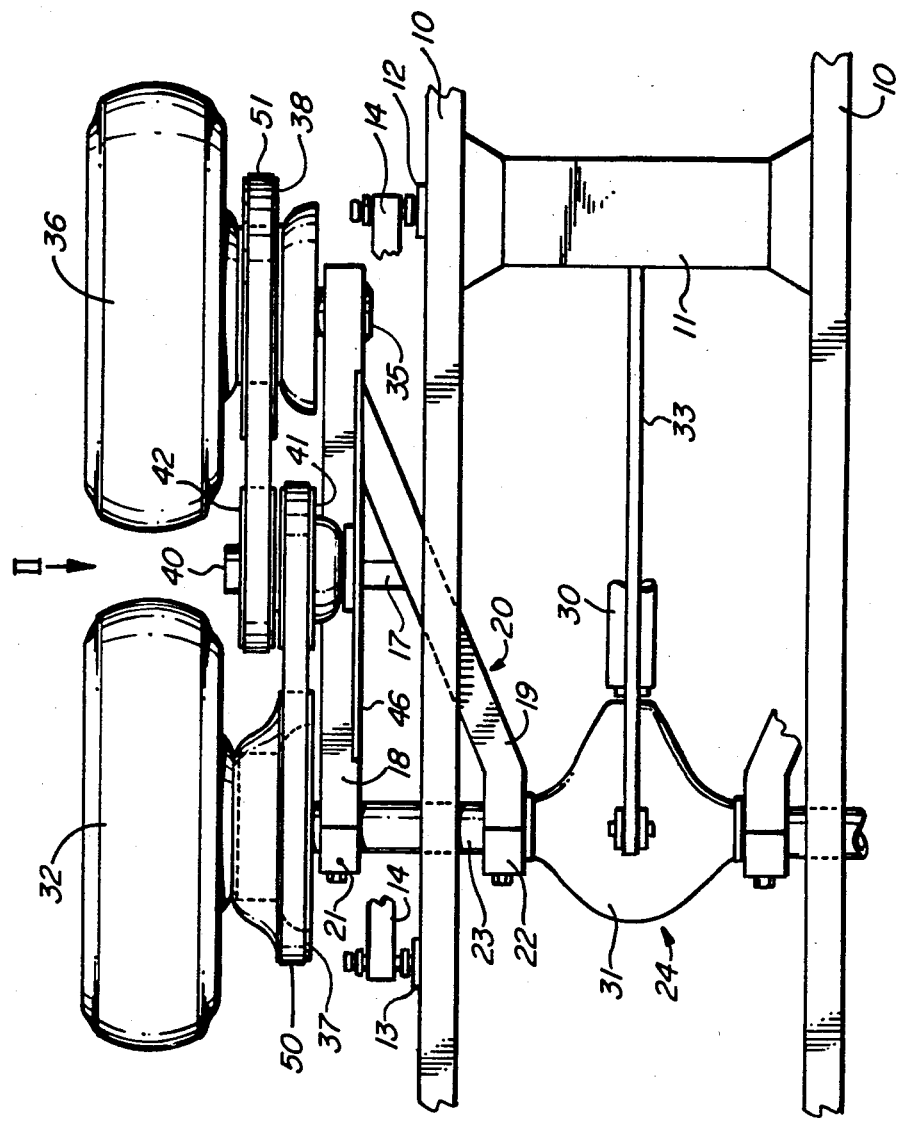
FIG. 1 is a plan view of a portion of the tandem rear wheel assembly of the preferred embodiment, the view illustrating the relative position between that assembly and the frame of the vehicle.
Figure 2:
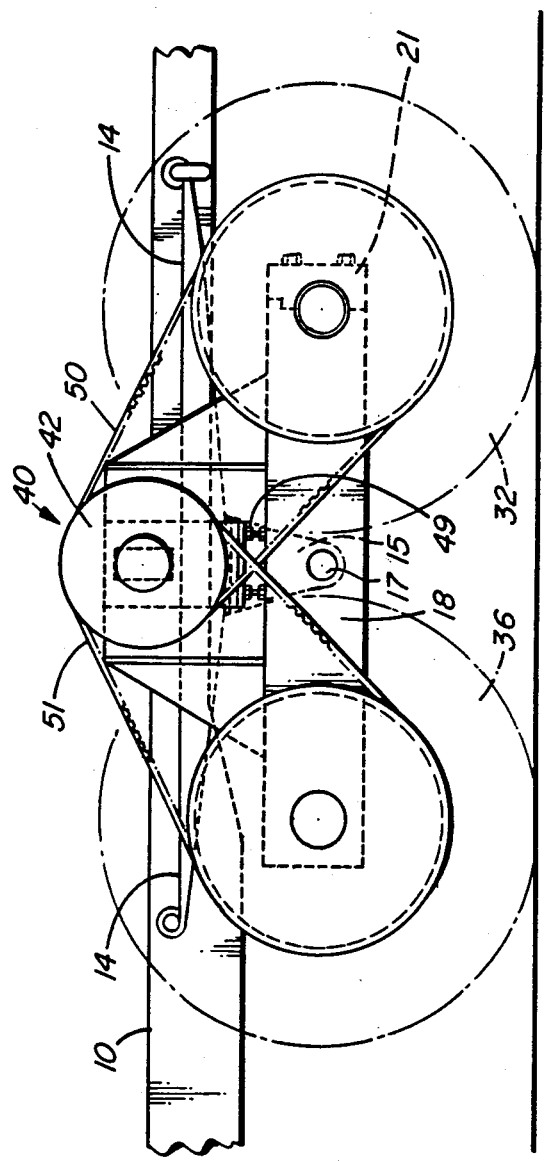
FIG. 2 is a side view of the tandem rear wheel assembly of the preferred embodiment.

With reference to FIG. 1, a pair of chassis frame rails 10 are connected by a cross member 11. Each chassis frame rail 10 has a forward suspension bracket 12 and a rearward suspension bracket 13 connected to its outer face, the pair of suspension brackets securing the outer ends of a leaf spring suspension assembly generally designated as 14. A leaf spring saddle 15 is connected by U-bolts 16 to a central position on each leaf spring assembly 14.

Each spring saddle 15 has a spring saddle trunnion pin 17 extending pivotally through its lower end, each trunnion pin 17 being connected between the first arm 18 and the second arm 19 of a respective walking beam generally designated as 20. Each pair of arms 18 and 19 are rigidly connected together proximate of their end, and each arm 19 extends at an angle of approximately 20° relative to each arm 18. The other end of the arms 18 and 19 have clamps 21 and 22, respectively, bolted thereto, the axle housing 23 on one side of drive axle 24 being secured between each arm and its associated clamp such that the arms are free to rotate on the housing.

Drive power supplied through axle 30 to differential gear box 31 drives the pair of wheels 32. Drive axle torque rod 33 connects the differential gear box 31 to cross member 11.

As can best be seen in FIG. 1, a stub axle 35 is rigidly connected to one end of walking beam 20 to extend outwardly on the vehicle parallel to drive axle 24. Rotatably connected to each stub axle 35 is a front wheel 36 extending in the same plane as the associated wheel 32. A gear wheel 37 having a circumference configured with grooves for receiving a drive belt is connected to the inner side of each wheel 32 to share a common axis of rotation with that wheel. A similar gear wheel 38 is connected to the inner side of each wheel 36 and shares a common axis of rotation with that wheel. The working surface of each gear wheel 37 is positioned in a vertical plane inward on the vehicle from the vertical plane extending through the working surface of the corresponding gear wheel 38.

Positioned between and above the axis of rotation of each of the gear wheels 37 and 38 is a clutch generally designated as 40 and having a pair of gear wheels 41 and 42 sharing a common axis thereon. Gear wheel 41 has a working surface generally positioned in the same vertical plane as the working surface of gear wheel 37 and gear wheel 42 has a working surface generally positioned in the same vertical plane as the working surface of gear wheel 38. The gear wheels 41 and 42 are each mounted by bearings on a spindle 44 of clutch 40 as shown in FIG. 4.

As shown in detail in FIG. 4, one end of spindle 44 is threaded to receive a nut 45 on the other side of a plate 46 extending vertically from walking beam 20 (see also FIG. 3). A second vertical plate 47 is positioned in slidable abutting relation to plate 46, as also shown in FIGS. 3 and 4. As shown in FIG. 4, an integral lip extends from plate 47 through a vertical aperture in plate 46, the depth of that lip being slightly greater than the thickness of plate 46 to allow spindle 44 to be vertically movable relative to plate 46. As shown in FIG. 3, the lower end of plate 47 extends horizontally and an adjustment screw 49 connecting that horizontal portion to arm 18 of walking beam 20 allows adjustable vertical positioning of plate 47. Once belt 50 has been placed around gear wheels 37 and 41 and belt 51 has been placed around gear wheels 38 and 42, adjustment screw 49 can be turned to raise plate 47 and clutch 40 and thus properly position belts 50 and 51. Each of those belts is a Gates Poly Chain* gear belt having a width of 2.17 inches and a yield strength of approximately 8,000 lbs. These gear belts which are formed from Fibreglas* with strands of Kevlar* extending longitudinally therethrough have no longitudinal stretch and must be properly aligned in use. On the inner face of each belt a series of laterally-extending semi-cylindrical teeth are longitudinally spaced, the configuration and spacing of the teeth corresponding to the configuration and spacing of the grooves on the circumference of the gear wheels. The belts 50 and 51 are installed with sufficient slackness that they deflect 1/64 inch per inch of span when the vehicle is at rest; such slackness allows for rotational speed difference between wheels 32 and 36 which may be encountered when travelling over rough terrain. The Gates Poly Chain* gear belts and suitable gear wheels are at present made in only certain sizes, and such limitations are a design consideration; information is available from the Gates Rubber Company on the utilization of the Gates Poly Chain* gear belts.

*Trademarks

Although the preferred embodiment utilizes only two gear belts extending around four gear wheels on each side of the vehicle, another embodiment (not shown) might require on each side of the vehicle the use of three gear belts extending around six gear wheels. In that further embodiment, the extra pair of gear wheels would rotate together on a common spindle secured to arm 18 of walking beam 20 at approximately the same height as the spindle 44 of clutch 40 in the preferred embodiment. Both the clutch and common spindle would sit between the axles of the front and rear wheels. In that other embodiment, the distance between the common spindle and the clutch spindle would be approximately the same as both the distance between the common spindle and the wheel proximate of it and the distance between the clutch spindle and the other wheel.

Returning to the preferred embodiment, FIG. 4 illustrates detail of the actuating mechanism of clutch 40, which detail has been omitted from FIG. 1 for better understanding of other portions of the preferred embodiment. Spindle 44 has a hollow center through which extends a pin 55 having a circular plate 56 secured to its one end and a connector formed in its other end. Pin 55 is axially slidable through spindle 44 by the action of one end of a lever arm 57 acting on the connector end of pin 55. Lever arm 57 is pivotally connected to the casing 58 of an actuator mechanism, the piston of that mechanism being connected to the other end of lever arm 57. Casing 58 is itself secured to plate 46. The actuator mechanism housed in casing 58 is remotely controlled by the operator of the vehicle from the cab of the vehicle. The actuator mechanisms mounted on both sides of the vehicle may be connected to act in parallel such that one action by the operator of the vehicle simultaneously actuates both; alternately, they may be individually actuated by the operator.

Circular plate 56 has a series of pins 60 extending at equiangularly-spaced intervals around its periphery, each pin 60 extending parallel to pin 55 through a corresponding aperture in gear wheel 42. With reference to FIG. 4, when pin 55 is positioned in its rightmost position such that its connector end abuts nut 45, the pins 60 extends through gear wheel 42 only. As pin 55 slides leftward, the pins 60 extend beyond gear wheel 42 into a series of corresponding apertures in gear wheel 41, gear wheels 41 and 42 thereby being caused to rotate together. The corresponding apertures in gear wheel 41 have countersunk ends adjacent to gear wheel 42 such that the ends of pins 60 always have sliding access into those corresponding apertures.

Although one type of clutch has been described in this preferred embodiment, it should be clear to somebody familiar with clutches that a different type of clutch could be utilized. For instance, friction plates could be mounted between the pair of gear wheels 41 and 42, and actuation of the clutch actuator mechanism could result in those plates being brought into contact.

The tandem rear wheel assembly of the subject invention may be fitted to a vehicle having a single pair of rear wheels. Such fitting is accomplished in the following manner. A jack or other hoisting mechanism is utilized to support the rear end of the vehicle off of the single pair of rear wheels. The axle of that single pair of rear wheels, which axle occupies approximately the longitudinal position later to be occupied by trunnion pin 17, is disconnected from the drive shaft and the drive axle torque rod. The pair of U-bolts 16 on each side of the vehicle are also removed to disconnect the axle from each leaf spring suspension assembly. Further, a torsion bar (not shown in the drawings) that extends between the frame and the axle is removed. The axle is then removed from under the rear end of the vehicle to be converted to the tandem rear wheel assembly. It may be necessary at this time to increase the size of the rear wheel wells of the vehicle to accommodate the assembly.

Once axle 24 has been removed from under the vehicle, the pair of wheels 32 are removed from the axle, a gear wheel 37 is bolted to the inner side of each wheel 32, and the pair of wheels 32 are then put back on axle 24. Next, a pair of walking beams 20, each having a clutch 40 and a stub axle 35 with an attached wheel 36, are bolted to axle 24. Each walking beam 20 is attached by first removing the bolts holding clamps 21 and 22 on arms 18 and 19 respectively, extending the semi-cylindrical ends of arms 18 and 19 around axle housing 23, and subsequently bolting clamps 21 and 22 to arms 18 and 19, respectively, the semi-cylindrical surfaces on those clamps abutting housing 23. After attachment of the arms to the housing, the arms still have sufficient freedom to rotate relative to the housing.

The belt 50 is then placed around gear wheels 37 and 41, and the belt 51 is then placed around gear wheels 42 and 51. The pair of adjustment screws 49 on each side of the vehicle are then adjusted until a suitable slackness is obtained in the belts i.e. approximately 1/64 inch of deflection per inch of span.

The tandem rear wheel assembly is then positioned under the rear end of the vehicle and the pair of leaf spring saddles 15 on the assembly are each connected by a pair of the large U-bolts 16 to a central position on a respective one of the suspension assemblies 14. A new elongated drive shaft 30 is then connected to the differential gear box 31 of drive axle 24, and a new elongated drive axle torque rod 33 is connected between cross member 11 and differential gear box 31. The torsion bar (not shown) is re-connected to extend between the frame of the vehicle and the walking beams, that connection to each walking beam being approximately below the centre of the respective suspension assembly 14. Next, an actuation means is installed in the cab of the vehicle for actuating either separately or simultaneously the clutch 40 on each side of the vehicle. A connection extends from the clutch actuation means in the cab of the vehicle to the clutch actuator mechanisms in the pair of casings 58. Thus, the pair of wheels 36 can be drivingly connected to the pair of wheels 32 by the operator of the vehicle from the cab of the vehicle.

I claim:

1. A tandem rear wheel assembly for a vehicle, the assembly comprising:
    (a) an axle having a drivable first pair of wheels mounted thereon;
    (b) a pair of arms, each arm having its one end secured to the axle at a position between the centre of the axle and a respective one of the wheels mounted thereon, the arms extending from the axle in generally parallel spaced relation and being of equal length;
    (c) a second pair of wheels, each wheel of the second pair of wheels being mounted for rotation on the other end of a respective one of the pair of arms, the rotational axes of the second pair of wheels being parallel to the axle;
    (d) actuable drive connection means being positioned between each wheel of the second pair of wheels and a respective one of the first pair of wheels, each wheel of the second pair of wheels being adapted to be driven by the respective one of the first pair of wheels during actuation of the drive connection means; and
    (e) a suspension assembly, the suspension assembly extending from the frame of the vehicle to a central position on the arms.

2. A tandem rear wheel assembly as in claim 1, wherein the suspension assembly is a leaf spring assembly having its one end pivotally connected to the frame and its other end connected to the frame by a pivotal linkage, the leaf spring assembly being connected to the central position on the arms.

3. A tandem rear wheel assembly as in any one of the claims 1 or 4, wherein each second wheel extends in the same plane as the respective one of the first pair of wheels.

4. A tandem rear wheel assembly as in claim 1, and also comprising a pair of support members, each support member extending at an angle to a respective one of the pair of arms and connecting the axle to the other end of that arm, the support member meeting the axle at a position between the centre of the axle and the position at which that arm meets the axle.

5. A tandem rear wheel assembly as in claim 4, wherein a connecting link extends between a central position on each arm and the respective support member, and wherein the wheel assembly is mounted on the frame of the vehicle by a pair of suspension assemblies, each suspension assembly extending from the frame of the vehicle to a respective connecting link.

6. A tandem rear wheel assembly as in claim 5, wherein each suspension assembly is a leaf spring assembly having its one end pivotally connected to the frame and its other end connected to the frame by a pivotal linkage, the centre of each leaf spring assembly being connected to the respective connecting arm.

7. A tandem rear wheel assembly for a vehicle, the assembly comprising:
    (a) an axle having a drivable first pair of wheels mounted thereon;
    (b) a pair of arms, each arm having its one end secured to the axle at a position between the centre of the axle and a respective one of the wheels mounted thereon, the arms extending from the axle in generally parallel spaced relation and being of equal length;
    (c) a second pair of wheels, each wheel of the second pair of wheels being mounted for rotation on the other end of a respective one of the pair of arms, the rotational axes of the second pair of wheels being parallel to the axle;
    (d) a pair of clutch assemblies, each clutch assembly being positioned between one of the wheels of the first pair of wheels and the respective one of the second pair of wheels, each clutch assembly being secured to a respective one of the arms and having engageable first and second gear wheel elements;
    (e) a pair of first gear wheel members secured to the first pair of wheels to rotate with those wheels, each first gear wheel member having a common axis of symmetry with the first pair of wheels;
    (f) a pair of second gear wheel members, each second gear wheel member being secured to one of the wheels of the respective one of the second pair of wheels and having a common axis of symmetry with that wheel;
    (g) a pair of first endless loop means, each first loop means extending around a respective first gear wheel element and around a respective one of the first gear wheel members;
    (h) a pair of second endless loop means, each second loop means extending around a respective second gear wheel element and around a respective one of the second gear wheel members; and
    (i) actuation means to actuate the pair of clutch assemblies, actuation of the clutch assemblies engaging each of the first gear wheel elements with the respective second gear wheel elements.

8. A tandem rear wheel assembly as in claim 7, wherein the first and second endless loop means are flexible positive drive belts having integral teeth positioned along their working surface, and wherein the engageable pair of gear wheel elements of the clutch means and the first and second gear wheel members each have a circumference configured with grooves for receiving the working surface of such a belt.

9. A tandem rear wheel assembly as in claim 8, wherein the engageable pair of gear wheel elements of the clutch means are rotatable on a common axis and have a pair of facing plates, and wherein a series of pins can be extended out of the one plate to engage with a corresponding series of apertures in the other plate to connect the gear wheel elements of the clutch means in driving relationship.

10. A tandem rear wheel assembly as in claim 9, wherein the actuation means is a cable extending from the cab of the vehicle and connecting to the series of pins in the one plate, and wherein movement of that cable in one direction results in the pins being extended out of that plate.

11. A tandem rear wheel assembly as in claim 7, wherein the actuation means has a portion extending into the cab occupied by a driver of the vehicle such that the pair of clutch assemblies can be actuated by the driver from the cab while the vehicle is in motion.

12. A tandem rear wheel assembly as in claim 7, wherein the wheel assembly is mounted on the frame of the vehicle by a suspension assembly, the suspension assembly extending from the frame of the vehicle to a central position on the arms.

13. A tandem rear wheel assembly as in any one of claims 1, 6 or 7, wherein the second pair of wheels is adapted to be positioned on the vehicle forward of the first pair of wheels.

14. A tandem rear wheel assembly for a vehicle, the assembly comprising:
   (a) an axle having a drivable first pair of wheels mounted thereon;
   (b) a pair of arms, each arm having its one end secured to the axle at a position between the centre of the axle and a respective one of the wheels mounted thereon, the arms extending from the axle in generally parallel spaced relation and being of equal length;
   (c) a second pair of wheels, each wheel of the second pair of wheels being mounted for rotation on the other end of a respective one of the pair of arms, the rotational axes of the second pair of wheels being parallel to the axle;
   (d) a pair of clutch assemblies, each clutch assembly being positioned between one of the wheels of the first pair of wheels and the respective one of the wheels of the second pair of wheels, each clutch assembly being secured to a respective one of the arms and having engageable first and second gear wheel elements;
   (e) a pair of gear wheel assemblies, each gear wheel assembly comprising an engaged pair of third gear wheel members mounted on a respective one of the arms to rotate together around a common axis of symmetry;
   (f) a pair of first gear wheel members secured to the first pair of wheels to rotate with those wheels, each first gear wheel member having a common axis of symmetry with the first pair of wheels;
   (g) a pair of second gear wheel members, each second gear wheel member being secured to a respective one of the second pair of wheels and having a common axis of symmetry with that wheel;
   (h) a pair of first endless loop means, each first loop means extending around a respective first gear wheel element and around a respective one of the first gear wheel members;
   (i) a pair of second endless loop means, each second loop means extending around a respective second rear wheel element and around a respective one of the third gear wheel members;
   (j) a pair of third endless loop means, each third loop means extending around the respective other one of the third gear wheel members and around a respective one of the second gear wheel members; and
   (k) actuation means to actuate the pair of clutch assemblies, actuation of the clutch assemblies engaging each of the first gear wheel elements with the respective second gear wheel elements.

15. A tandem rear wheel assembly as in claim 14, wherein the actuation means has a portion extending into the cab occupied by a driver of the vehicle such that the pair of clutch assemblies can be actuated by the driver from the cab while the vehicle is in motion.

16. A tandem rear wheel assembly as in claim 14, wherein the wheel assembly is mounted on the frame of the vehicle by a suspension assembly, the suspension assembly extending from the frame of the vehicle to a central position on the arms.

* * * * *